United States Patent [19]

Weimer

[11] Patent Number: 4,539,755
[45] Date of Patent: Sep. 10, 1985

[54] TURBINE COMPRESSOR CLEARANCE INDICATOR DEVICE AND METHOD OF USING SAME

[76] Inventor: Daniel V. Weimer, 423 S. Washington St., Milford, Del. 19963

[21] Appl. No.: 617,664

[22] Filed: Jun. 6, 1984

[51] Int. Cl.³ .............................. G01B 5/08; G01B 5/20
[52] U.S. Cl. ................................................. 33/172 R
[58] Field of Search ............. 33/169 B, 169 F, 178 R, 33/172 R

[56] References Cited

U.S. PATENT DOCUMENTS

| | | | |
|---|---|---|---|
| 1,093,307 | 4/1914 | Becker | 33/172 R |
| 1,536,576 | 5/1925 | Fields . | |
| 1,672,566 | 6/1928 | Glancy et al. | 33/172 R |
| 1,922,895 | 8/1933 | Lemaire | 33/169 |
| 2,169,952 | 8/1939 | Holmes | 33/126.7 |
| 2,599,835 | 6/1952 | Johnson et al. | 33/172 |
| 3,848,339 | 11/1974 | Strasbaugh | 33/174 A |

*Primary Examiner*—Robert I. Smith
*Attorney, Agent, or Firm*—Donald J. Singer; Stanton E. Collier

[57] ABSTRACT

A turbine compressor clearance indicator device is used to measure the clearance between a rotor blade and a case and/or between a stator vane and a rotor shaft. The device has a dial indicator mounted in a "U" shaped holder having two feet. Each foot has two surfaces, one concave and one convex, for use on two different curved surfaces. The thicknesses of wax strips are measured once they are cut away by the tips of the blades and vanes.

2 Claims, 4 Drawing Figures

TURBINE COMPRESSOR CLEARANCE INDICATOR DEVICE AND METHOD OF USING SAME

STATEMENT OF GOVERNMENT INTEREST

The invention described herein may be manufactured and used by or for the Government for governmental purposes without the payment of any royalty thereon.

BACKGROUND OF THE INVENTION

This invention relates generally to device for measuring thicknesses of material, and, in particular, relates to a device for measuring turbine blade and vane clearances to other radially directed surfaces.

In a turbine engine, in an axial flow compressor section, in particular, a rotor shaft has attached thereon a plurality of rotor blades. The blades are positioned in circumferential rows that are spaced apart. Between these rows are located stator vanes, non-rotating, attached to the compressor case. The tips of the rotor blades and the tips of the stator vanes come in close proximity with the compressor case or the rotor shaft, respectfully.

During maintenance, these radial clearances are required to be determined to calculate whether the blades or vanes require replacement. To do such, small rectangular wax strips are attached between these critical areas and the rotor rotated a few rotations to cause the tips to remove the interferring wax of the wax strips. The remaining wax strip height thus indicates the clearance.

In the past, these wax strips were removed and measured with a micrometer. Although this procedure accomplished the desired result, the wax strips could become deformed during removal. This required that each strip be handled with great care, and since many strips are used to test one turbine engine, this procedure involved many additional hours of labor and possible erroneous results costing in labor and new blades or vanes being installed.

These drawbacks have motivated a search for alternative devices and procedures.

SUMMARY OF THE INVENTION

The present invention is directed toward providing a compressor clearance indicator device in which the above disadvantages are minimized or removed.

One desires to measure the thickness of a wax strip attached to either a convex or a concave cylindrical surface located between sets of rotor blades or stator vanes, respectively. Further, the radii of the surfaces vary between a minimum and a maximum whether a concave or a convex surface.

The indicator device of the present invention includes a dial indicator with an extended plunger and a holder into which the dial indicator is mounted. The extended plunger has an external housing which is adjustably held by the holder. A longitudinal hole, parallel to the legs, accepts the external housing of the dial indicator. A set screw, inserted into the side of the hole, allows for the vertical adjustment of the dial indicator as desired.

The holder is "U" shaped having two opposed legs connected by a member that further holds the dial indicator. Each leg has a foot which has a convex outer surface and a concave inner surface. Each surface having a radius of curvature that is an average of a minimum and a maximum radius of a rotor or compressor case curvature.

In operation, the clearance indicator device is set on, for example, a convex surface of the rotor between two different sets of rotor blades. The plunger is adjusted to a zero reading on the convex surface of the rotor. The device is then moved so that the plunger comes down on the wax strip. The difference between the two readings indicates the thickness of the wax strip and thus the clearance between the rotor and the stator vane at that location.

One object of the present invention is to provide for a clearance indicator device usable on both convex and concave surfaces of varying radii.

Another object of the present invention is to provide for an indicator device for measuring tip clearances in turbine engines.

These and many other objects and advantages of the present invention will be readily apparent to one skilled in the pertinent art from the following detailed description of a preferred embodiment of the invention and the related drawings.

DETAILED DESCRIPTION OF THE PREFERRED EMBODIMENT

Figure 1:
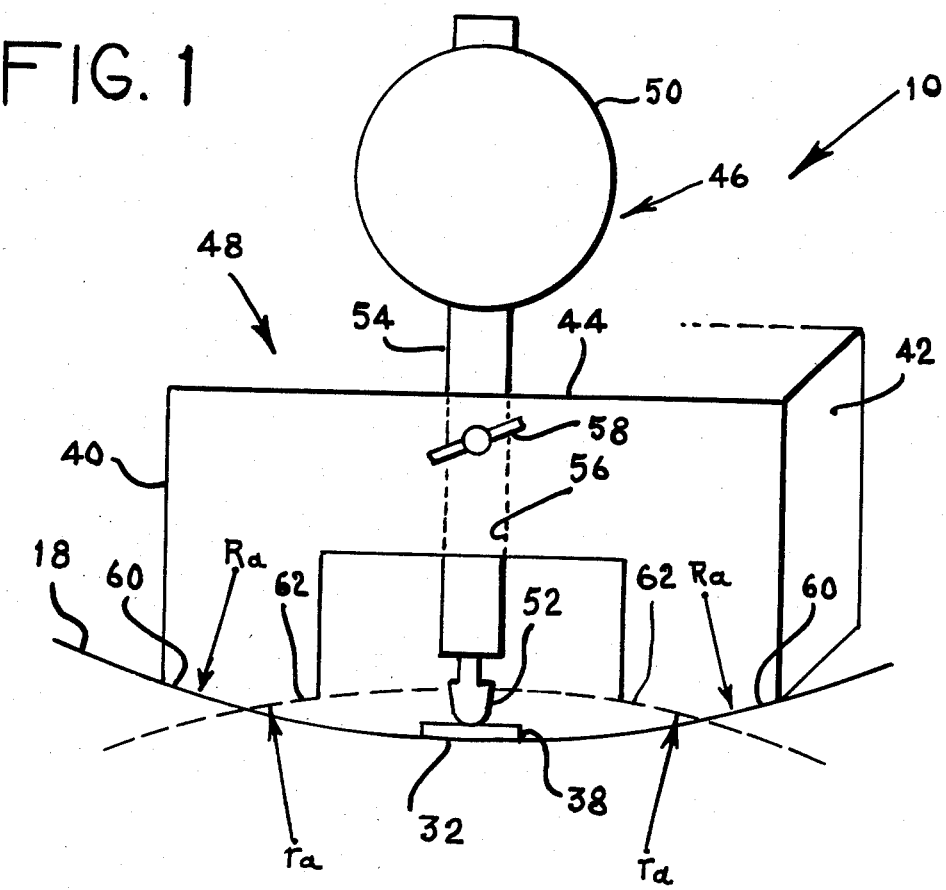
FIG. 1 is a front view of the clearance indicator device of the present invention.
Figure 2:
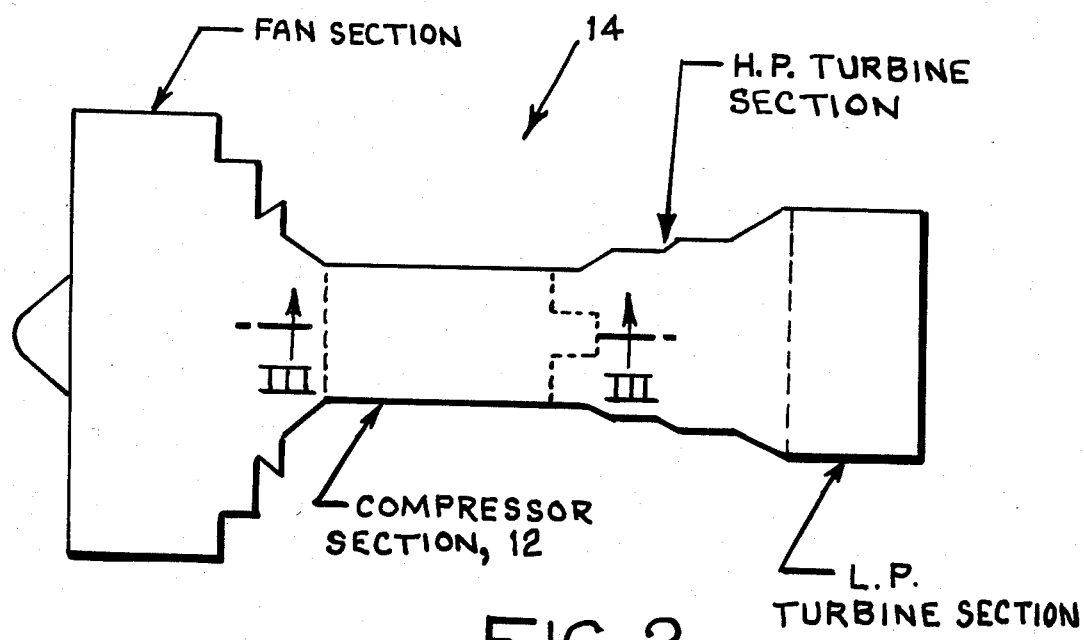
FIG. 2 is a cross-section of a turbine engine on which the present invention is used.
Figure 3:
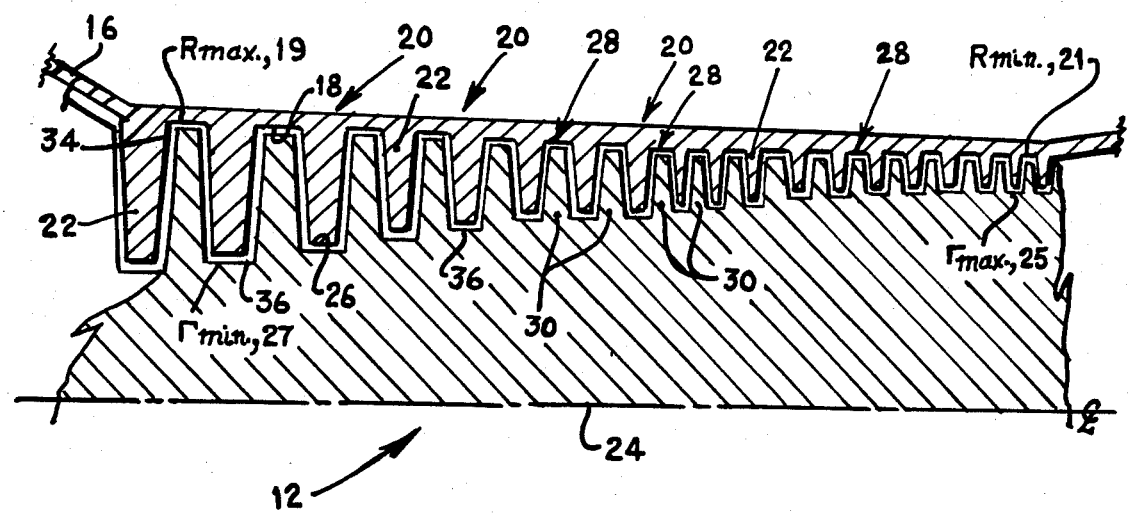
FIG. 3 is a partial cross-section of the compressor section showing the location where the present invention is used.

Referring to FIG. 1, a clearance indicator device 10 is used to measure either blade or vane tip clearance in a conventional turbine engine 14 shown in cross-section in FIG. 2. In particular, a compressor section 12 of engine 14, shown in FIG. 3, is the primary area of application. Although, the invention could easily be adapted for other use.

In FIG. 3, a compressor case 16, stationary, has attached about an inner cylindrical concave surface 18 a plurality of sets 20 of stator vanes 22, only those along cross-section III shown. The radius of curvature of surface 18 ranges from $R_{max}$ 19 to $R_{min}$ 21 at the locations shown.

The distance between each set 20 of stator vanes 22 is about 0.75 inches. Each vane 22 is fixedly attached to case 16 in a conventional manner but can be removed if it is distorted in length, fractured or otherwise damaged.

A rotor 24, shown in partial cross-section has attached thereon about an outer cylindrical convex surface 26 a plurality of sets 28 of rotor blades 30. The radius of curvature of surface 26 ranges from $r_{max}$ 25 to $r_{min}$ 27 at the locations shown.

Figure 4:
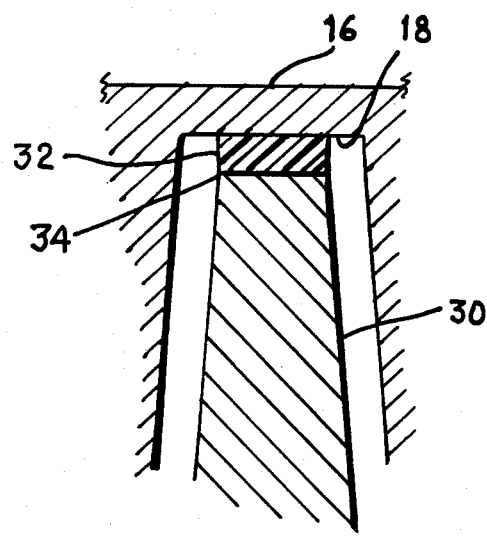
FIG. 4 illustrates a wax strip between a blade tip and a compressor case.

Referring to FIG. 1, a wax strip 32, being one of many, is attached to surfaces 18 or 26. In order to attach strips 32, compressor case 16 is separated into halves and removed from rotor 24. This allows wax strips 32 to be placed between rotor blades 30 and between stator vanes 22. When case 16 is assembled wax strips 32 are then between blade tips 34 and surface 18 and between stator vane tips 36 and surface 26, FIG. 4 showing only prior configuration. Rotor 24 is then rotated to cause tips 34 and 36 to cut away excess wax of strips 32. Case 16 is then removed from rotor 24 again, and then wax strip thickness 38 is measured with device 10 as shown in FIG. 1.

Referring back to FIG. 1, device 10 uses a conventional dial indicator 46 attached to a holder 48. Indicator 46 has a meter 50 connected to a plunger 52. Plunger 52 is movably held within a housing 54, and housing 54 is selectively locked within a hole 56 by a set screw 58.

Holder 48 has two feet 40 and 42 connected by a bridge member 44. As shown, holder 48 can be machined from a solid piece of metal such as aluminum. Hole 56 is centered between feet 40 and 42 and is parallel thereto. As shown, device 10 is measuring the thickness 38 of wax strip 32 attached to concave surface 18. Convex surface 26 is shown in outline and is in contact with feet 40 and 42.

Each foot of feet 40 and 42 has an outer convex surface 60 and an inner concave surface 62. The radius of curvature of convex surface 60, $R_a$, is given by:

$$R_a = \frac{R_{min} + R_{max}}{2} \quad (I)$$

and the radius of curvature of concave surface 62, $r_a$, is given by:

$$r_a = \frac{r_{min} + r_{max}}{2} \quad (II)$$

The thickness of feet 40 and 42 is about 0.75 inches, the distance between sets of blades 30 or vanes 22. Each foot must have a thickness sufficient to allow device 10 to stand by itself. The width of surfaces 60 and 62 is about equal so that device 10 is stable when placed on either surface 18 or 26.

In operation, referring to FIG. 1, device 10 is placed on surface 18 so that plunger 52 contacts, surface 18. Set screw 58 is locked once housing 54 is properly positioned in holder 48 so that plunger 50 can be freely moved. The needle, not shown, in meter 50 is zeroed when plunger 52 contacts surface 18. After this, device 10 is moved so that plunger 52 contacts wax strip 32. Meter 50 should then indicate the actual thickness 38 of strip 32. Zeroing is not critical to this method since the difference between reading can be taken to indicate actual thickness. If zeroing is used, housing 54 of indicator 46 must be readjusted when device 10 is moved to a different horizontal location along compressor 24. If the difference reading is used, readjustment is not required.

Clearly, many modifications and variations of the present invention are possible in light of the above teachings and it is therefore understood, that within the inventive scope of the inventive concept, the invention may be practiced otherwise than specifically claimed.

What is claimed is:

1. A clearance indicator device for use in measuring rotor blade/stator vane clearances in jet turbine engines, said device comprising:
   a dial indicator, said indicator having a plunger that moves within a housing attached to a meter, said plunger and said meter indicating distance moved, and
   a holder, said holder having two feet and a connecting member between said feet, said connecting member having a hole therethrough for selectively holding said housing of said indicator, said feet having on each an outer convex surface and an inner concave surface, both being rectangular shaped and positioned at an obtuse angle to each, said holder being vertically stable without further support, said convex surface having a radius of curvature defined by:

$$R_a = \frac{R_{max} + R_{min}}{2}$$

$R_a$ being the average radius,
$R_{max}$ being the maximum radius of a concave surface, and
$R_{min}$ being the minimum radius of a concave surface; said concave surface having a radius of curvature defined by:

$$r_a = \frac{r_{max} + r_{min}}{2}$$

wherein said
$r_a$ being the average radius of a convex surface,
$r_{max}$ being the maximum radius of said convex surface,
$r_{min}$ being the minimum radius of said convex surface.

2. A method of measuring rotor blade/stator vane clearances in jet turbine engines, said method comprising the steps of:
   separating a stator case of said jet turbine engine to obtain access to compressor rotor blades and stator vanes;
   attaching wax strips to a compressor rotor and to a stator case,
   closing said stator case,
   rotating said compressor rotor;
   separating said stator case; and
   measuring the thickness of said wax strips while attached to said jet turbine engine with a clearance indicator device, said clearance indicator device having a holder with a dial indicator mounted therein, said holder having two feet and a connecting member between said feet, said connecting member having a hole therethrough for selectively holding said housing of said indicator, said feet having on each an outer convex surface and inner concave surface, both being rectangular shaped and positioned at an obtuse angle to each, said holder being vertically stable without further support, said convex surface having a radius of curvature defined by:

$$R_a = \frac{R_{max} + R_{min}}{2}$$

wherein said
$R_a$ being the average radius,
$R_{max}$ being the maximum radius of a concave surface, and
$R_{min}$ being the minimum radius of a concave surface; said concave surface having a radius of curvature defined by:

$$r_a = \frac{r_{max} + r_{min}}{2}$$

wherein said
$r_a$ being the average radius of a convex surface,
$r_{max}$ being the maximum radius of said convex surface,
$r_{min}$ being the minimum radius of said convex surface.

* * * * *